3,167,406
PREPARATION OF BRAZING ALLOYS AND
PRODUCTS FORMED THEREBY
Arthur T. Cape, Monterey, Calif., assignor to Coast Metals, Inc., Little Ferry, N.J., a corporation of Delaware
No Drawing. Filed Jan. 31, 1963, Ser. No. 255,203
8 Claims. (Cl. 29—198)

This invention relates generally to improvements in the preparation of certain types of brazing alloys, but has reference more particularly to the preparation of such alloys in the form of strip, which is peculiarly adaptable for many types of brazing.

In my copending application, Serial No. 164,411, there is disclosed a manganese-base brazing alloy consisting essentially of manganese in amounts of from 63% to 69%, nickel in amounts of from 14% to 18%, and cobalt in amounts of from 14% to 18%.

Due to the presence of cobalt, the alloy is difficult to roll into the form of strip or foil, in which form, as stated, it is desirable for many brazing purposes.

It is, however, possible to purchase manganese-nickel alloys in the form of strip or foil. One of these readily available alloys in strip form, consists of about 70% manganese and about 30% nickel, and another consists of about 80% manganese and about 20% nickel.

In order to provide a manganese-nickel-cobalt alloy in strip form, without the necessity of preparing the alloy and attempting to roll it into the form of strip, I utilize, as a base for the alloy, the manganese-nickel strip, which is available, and spray onto such strip metallic cobalt, in an amount such that the composite manganese-nickel strip and the sprayed-on coating of cobalt, when used as a brazing material, melts to form a brazing alloy which consists of from about 55% to 78% manganese, from about 14% to about 30% nickel, and from about 2% to about 20% cobalt.

The cobalt may be sprayed onto the manganese-nickel strip with a powder gun, such, for example, as that disclosed in my copending application, Serial No. 47,053, or it may be sprayed onto the strip by means of a plasma arc gun.

Examples of the invention are as follows:

If manganese-nickel strip consisting of 70% manganese and 30% nickel is used as the base for the cobalt coating, and there is sprayed onto the strip an amount of cobalt equivalent to 5% of the weight of the manganese-nickel strip, the resulting composite strip will form a brazing composition consisting of about 66.67% manganese, about 28.56% nickel, and about 4.77% cobalt.

If manganese-nickel strip consisting of 70% manganese and 30% nickel is used as the base for the cobalt coating, and there is sprayed onto the strip an amount of cobalt equivalent to 20% of the weight of the manganese-nickel strip, the resulting composite strip will form a brazing alloy consisting of about 58.3% manganese, about 25% nickel, and about 16.7% cobalt.

If manganese-nickel strip consisting of 80% manganese and 20% nickel is used as the base for the cobalt coating, and there is sprayed onto the strip an amount of cobalt equivalent to 5% of the weight of the manganese-nickel strip, the resulting composite strip will form a brazing composition consisting of about 76.2% manganese, about 19% nickel, and about 4.8% cobalt.

If manganese-nickel strip consisting of 80% manganese and 20% nickel is used as the base for the cobalt coating, and there is sprayed onto the strip an amount of cobalt equivalent to 20% of the weight of the manganese-nickel strip, the resulting composite strip will form a brazing composition consisting of about 66.67% manganese, about 16.67% nickel, and about 16.66% cobalt.

It will be understood that manganese-nickel strip containing manganese and nickel in different proportions than those described above may be utilized in the preparation of the cobalt coated brazing material, but, in general, the method is confined to the production of material containing from about 2% to about 20% cobalt, since cobalt, in amounts less than 2%, in a manganese-nickel-cobalt alloy, can be rolled into strip, under certain conditions, whereas alloys containing in excess of about 20% cobalt, are not ordinarily used for brazing purposes.

It will also be understood that changes may be made in the method and composite strip, without departing from the spirit of the invention, or the scope of the appended claims.

Having thus described my invention, I claim:

1. In the preparation of brazing alloys containing an element which renders the alloy difficult to roll into strip form, the step which comprises applying to the alloy in strip form, and which does not contain said element, a coating of said element, whereby a composite strip of said brazing alloy is formed, which, when melted, includes said element as a component thereof.

2. In the preparation of a manganese-nickel-cobalt brazing alloy, the step of spraying onto a manganese-nickel strip a coating of cobalt to a thickness such that when the coated strip is melted, an alloy is formed consisting of from about 55% to about 78% manganese, from about 14% to about 30% nickel, and from about 2% to about 20% cobalt.

3. In the preparation of a manganese-nickel-cobalt brazing alloy, the step of spraying upon the surface of a strip consisting of from about 70% to about 80% manganese, and from about 20% to about 30% nickel, metallic cobalt in an amount such that when the strip and coating are melted, a brazing alloy is formed consisting of from about 55% to about 78% manganese, from about 14% to about 30% nickel, and from about 2% to about 20% cobalt.

4. A composite brazing composition consisting of a manganese-nickel strip, having a coating of metallic cobalt thereon.

5. A composite brazing composition consisting of a metal strip consisting of from about 70% to about 80% manganese, and from about 20% to about 30% nickel, said strip having a coating of metallic cobalt thereon, in an amount such that when the coated strip is melted, a brazing alloy is formed, consisting of from about 55% to about 78% manganese, from about 14% to about 30% nickel, and from about 2% to about 20% cobalt.

6. The method which comprises the steps of providing a manganese-nickel alloy strip, spraying onto said strip a coating of cobalt to a thickness such that when the strip and coating are melted an alloy is formed consisting of from about 55% to about 78% manganese, from about 14% to about 30% nickel, and from about 2% to about 20% cobalt, interposing said coated strip between parts to be brazed, and heating said parts and coated strip to a temperature at which the coated strip melts and the parts are brazed.

7. The method, as defined in claim 6, wherein the strip, before being coated, consists of from about 70% to about 80% manganese, and from about 20% to about 30% nickel.

8. A composite brazing strip adapted to be used in strip form for brazing, said composite strip consisting of from about 70% to about 80% maganese, and from about 20% to about 30% nickel, said strip having a coating of cobalt therein, in an amount such that when the coated strip is melted incidental to a brazing operation, it provides a brazing alloy consisting of from about 55% to about 78% manganese, from about 14% to about 30% nickel, and from about 2% to about 20% cobalt.

References Cited in the file of this patent

UNITED STATES PATENTS

| | | |
|---|---|---|
| 2,325,068 | McLaughlin | July 27, 1943 |
| 2,366,601 | Dean | Jan. 2, 1945 |
| 2,833,668 | Dailey et al. | May 6, 1958 |
| 2,856,281 | Cremer et al. | Oct. 14, 1958 |
| 2,961,312 | Elbaum | Nov. 22, 1960 |